(12) United States Patent
Al-Ansary et al.

(10) Patent No.: US 8,800,548 B2
(45) Date of Patent: Aug. 12, 2014

(54) GLASS SOLAR RECEIVER WITH BIFURCATED ANNULUS RESPONSIVE TO THERMAL DIMENSIONAL CHANGES

(75) Inventors: Hany Abdulrahman M. Al-Ansary, Riyadh (SA); Mazen Abdullah Ba-Abbad, Riyadh (SA)

(73) Assignee: King Saud University, Riyadh (SA)

( * ) Notice: Subject to any disclaimer, the term of this patent is extended or adjusted under 35 U.S.C. 154(b) by 464 days.

(21) Appl. No.: 12/718,960

(22) Filed: Mar. 6, 2010

(65) Prior Publication Data

US 2011/0214668 A1    Sep. 8, 2011

(51) Int. Cl.
| | |
|---|---|
| F24J 2/50 | (2006.01) |
| F24J 2/10 | (2006.01) |
| F24J 2/24 | (2006.01) |
| F24J 2/12 | (2006.01) |
| F28F 7/00 | (2006.01) |

(52) U.S. Cl.
USPC ........... 126/652; 126/657; 126/658; 126/659; 126/694; 165/185

(58) Field of Classification Search
USPC ........... 126/652, 657, 658, 659, 694; 165/185
See application file for complete search history.

(56) References Cited

U.S. PATENT DOCUMENTS

| | | | | |
|---|---|---|---|---|
| 1,661,473 | A | * | 3/1928 | Goddard et al. ............... 126/685 |
| 4,069,811 | A | * | 1/1978 | Tabor ............................ 126/655 |
| 4,231,353 | A | * | 11/1980 | Kanatani et al. ............... 126/652 |
| 5,572,987 | A | * | 11/1996 | Moratalla et al. .............. 126/652 |
| 2008/0245519 | A1 | * | 10/2008 | Ustun ............................ 165/181 |
| 2009/0114209 | A1 | * | 5/2009 | Moller et al. .................. 126/569 |

OTHER PUBLICATIONS

Hibbler, Mechanics of Materials, Pearson Prentice Hall, 8th Edition, pp. 151.*

* cited by examiner

*Primary Examiner* — Kenneth Rinehart
*Assistant Examiner* — William Corboy
(74) *Attorney, Agent, or Firm* — Hart IP Law & Strategies

(57) ABSTRACT

A solar power conversion receiver is described. In one aspect, the solar power conversion receiver includes a circular glass envelope and an absorber tube encapsulated within the circular glass envelope. An annulus, positioned between the circular glass envelope and the outer perimeter of the absorber tube, is bifurcated by first and second fins operatively coupled to the circular glass envelope and the absorber tube. These fins create first and second annulus compartments that are substantially sealed off, or independent, from one another. The first and second fins are ductile and responsive to expansion and contraction of components in the solar power conversion receiver due to temperature effects. In one aspect, gas in the lower annulus compartment stratifies with cooler gas interfacing with the encapsulating glass envelope, and hotter gas interfacing with the hotter absorber tube, resulting reduced natural convection heat loss as compared to conventional glass encapsulated receivers.

20 Claims, 7 Drawing Sheets

GLASS SOLAR RECEIVER WITH BIFURCATED ANNULUS RESPONSIVE TO THERMAL DIMENSIONAL CHANGES

BACKGROUND

Parabolic trough collector (PTC) technology is used to collect solar energy, and is one of a number of concentrated solar power (CSP) conversion methods. This technology is frequently implemented, for example, in heat systems, including air and water based applications and solar steam generation systems, solar refrigeration systems, solar desalination systems (solar stills and desalination equivalent powered by solar collectors), solar thermal power generation systems, etc. One possible reason for the success of parabolic trough collector systems is their ability to concentrate incident solar radiation many fold such that the fluid being heated can reach a temperature of approximately 400° C., which renders this technology particularly suitable for generating power.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, a solar power conversion receiver is described. The solar power conversion receiver includes a circular glass envelope and an absorber tube encapsulated within the circular glass envelope. An annulus, positioned between the circular glass envelope and the outer perimeter of the absorber tube, is bifurcated by first and second fins operatively coupled to the circular glass envelope and the absorber tube. These fins create first and second annulus compartments that are sealed off, or independent, from one another. The first and second fins are ductile and responsive to expansion and contraction of components in the solar power conversion receiver, for example, due to temperature effects. In certain scenarios, described below, gas in the lower annulus compartment stratifies, wherein denser cooler gas collects at the bottom of the compartment to interface with a relatively cooler glass surface, and hotter lighter gas trends towards the top of the compartment in the direction of the hotter absorber tube. In this scenario, the hotter gas is generally not interfacing with the cooler glass surface, likely reducing heat loss through natural convection as compared to such heat loss in conventional glass encapsulated receivers.

BRIEF DESCRIPTION OF THE DRAWINGS

FIG. 6 shows that each of the two fins that collectively bifurcate the receiver annulus comprises multiple independent components configured to work together and maintain integrity of the glass envelope by responding to thermal dimensional changes of the encapsulating glass envelope and/or the absorber tube.

FIG. 7 shows use of an insulating material in a non-gas filled portion of the annulus in the power conversion receiver.

FIG. 8 illustrates rotation of the receiver to receive substantially optimal amounts of solar irradiation as a function of sun location.

DETAILED DESCRIPTION

Overview

Figure 1:
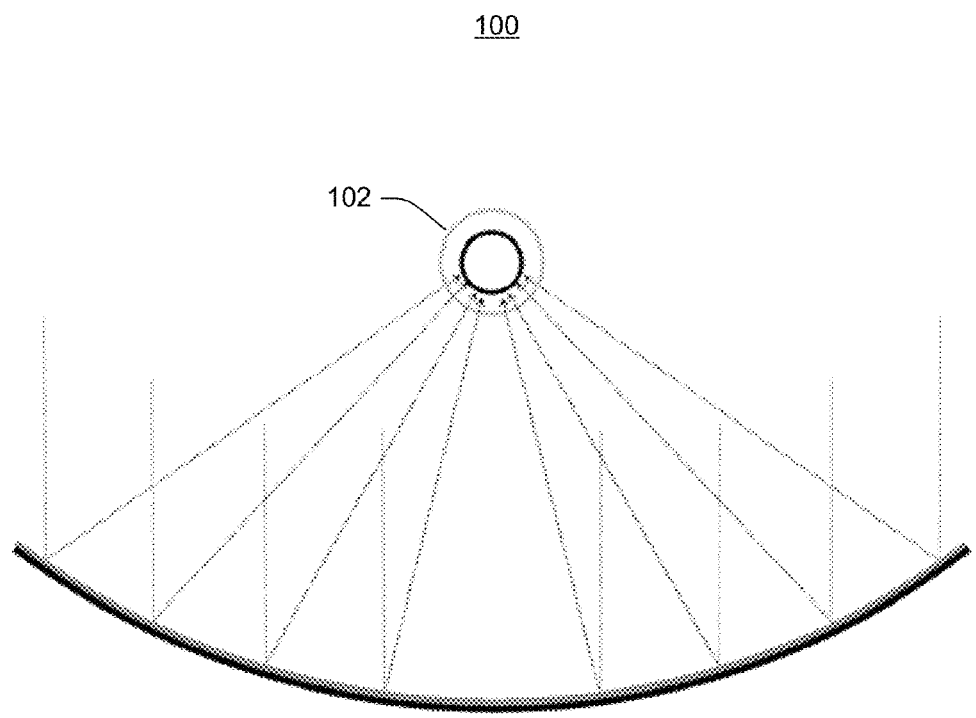
FIG. 1 shows how a parabolic-shaped mirror in a parabolic trough collector system is used to reflect and concentrate incident solar radiation on a receiver located at the focus of the parabola.

FIG. 1 illustrates how a parabolic-shaped mirror in a parabolic trough collector system 100 is used to reflect and concentrate incident solar radiation on a receiver 102 located at the focus of the parabola. This figure shows the incident radiation as dotted lines. The mirror and the receiver may be linearly extended to form a trough-shaped mirror and an elongated receiver tube. A heat transfer fluid such as water or oil can be utilized within an absorber portion of the receiver tube to absorb the concentrated solar radiation for subsequent power generation.

Figure 2A:
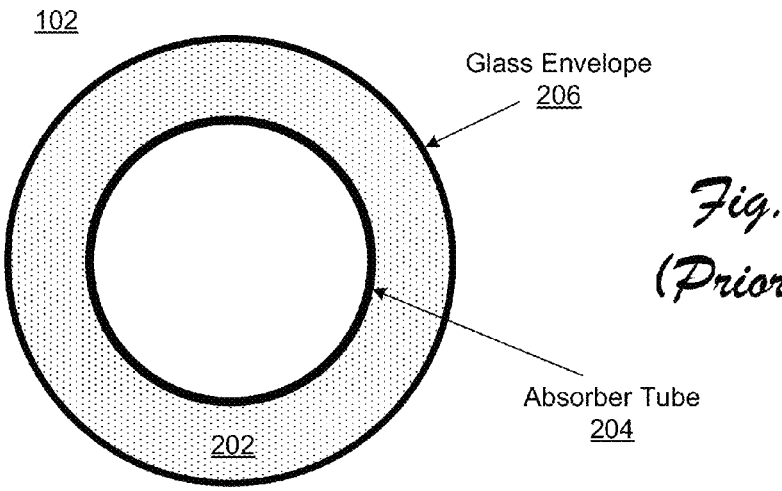
FIG. 2a shows exemplary features of a conventional solar power conversion receiver for use in solar parabolic trough collector systems.

FIG. 2a shows aspects of a conventional annulus 202 in a standard non-evacuated solar power conversion receiver 102 of a parabolic trough collector system. For purposes of exemplary illustration and description, the left-most reference number of each component in this figure refers to the particular figure that first introduced the component. For example, the left-most numeral in reference number 102 is a "1," indicating that component 102 was initially introduced in FIG. 1. Referring to FIG. 2a, the shaded portion 202 between the outer surface of the absorber tube 204 and the inner portion of the glass envelope 206 represents the annulus. Conventional techniques to reduce receiver 102 radiation losses include application of a selective coating that possesses low emissivity to the absorber tube. Another standard technique is to create a vacuum (i.e. evacuate) the annulus 202 of receiver 102. This latter technique may nearly eliminate natural convection losses from the annulus of the receiver. Evacuated receivers are generally expensive and may constitute a substantial percentage of the cost of a parabolic trough collector system. One reason for this expense is the advanced technology typically used to keep the annulus of the receiver under very high vacuum. Another reason for such costs is the technology needed to avoid performance degradation because of hydrogen permeation from the heat transfer fluid through the absorber tube walls and into the annulus. Replacement cost of evacuated receivers in a parabolic trough collector system is generally high. Such replacement costs may be incurred every time a receiver's glass envelope is broken and vacuum is lost.

Figure 2B:
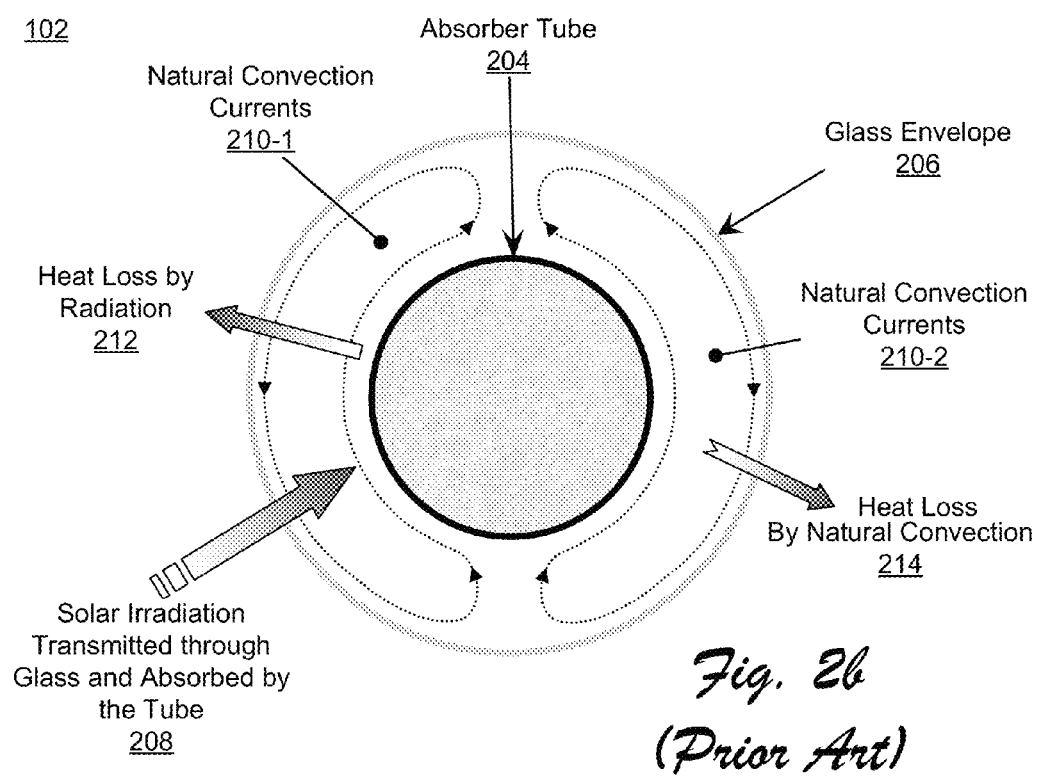
FIG. 2b shows several common heat gain and loss mechanisms associated with conventional non-evacuated such solar power conversion receivers.

FIG. 2b shows features of a conventional receiver 102 of a parabolic trough collector system in association with the receiver's prevalent heat gain and loss mechanisms. In this example, and as discussed above with respect to FIG., 2a, standard or conventional receiver 102 consists of an inner absorber tube 204. A heat transfer fluid (not shown) typically flows in the absorber tube. Receiver 102 further consists of an outer transparent enclosure 206, which in this example, is made of glass. Solar radiation 208 is concentrated on the receiver 102 by a parabolic mirror in the trough collector system. Although standard receiver 102 is configured to minimize convection heat loss to surroundings due to the interaction between the hot surface of the inner absorber tube 204 and the ambient air surrounding the receiver 102, natural convection and radiation heat loss are still two main sources of heat loss from receiver 102. Natural convection heat loss occurs, for example, due to buoyancy-induced currents 210 (e.g., 210-1 and 210-2) when the annulus area of the receiver (i.e., the area between the outer surface of the absorber tube 204 and the inner portion of the glass envelope 206) is filled, for example, with air, hydrogen, or a noble gas. In this example, radiation heat losses from receiver 102 are represented by arrow 212. Natural convection heat losses from conventional receiver 102 are represented by arrow 214.

FIG. 3 through FIG. 8 show respective aspects of an exemplary bifurcated annulus solar power conversion receiver 300 for use in solar parabolic trough collector system(s), according to one embodiment. The segmented architecture and other novel aspects of this novel receiver 300 addresses limitations, such as those discussed above, of conventional solar power conversion receivers (e.g., the receiver 102 of FIGS. 2a and 2b). Various exemplary aspects of the bifurcated annulus solar power conversion receiver 300 are now described in greater detail.

An Exemplary Solar Power Conversion Receiver with Bifurcated Annulus

Figure 3:
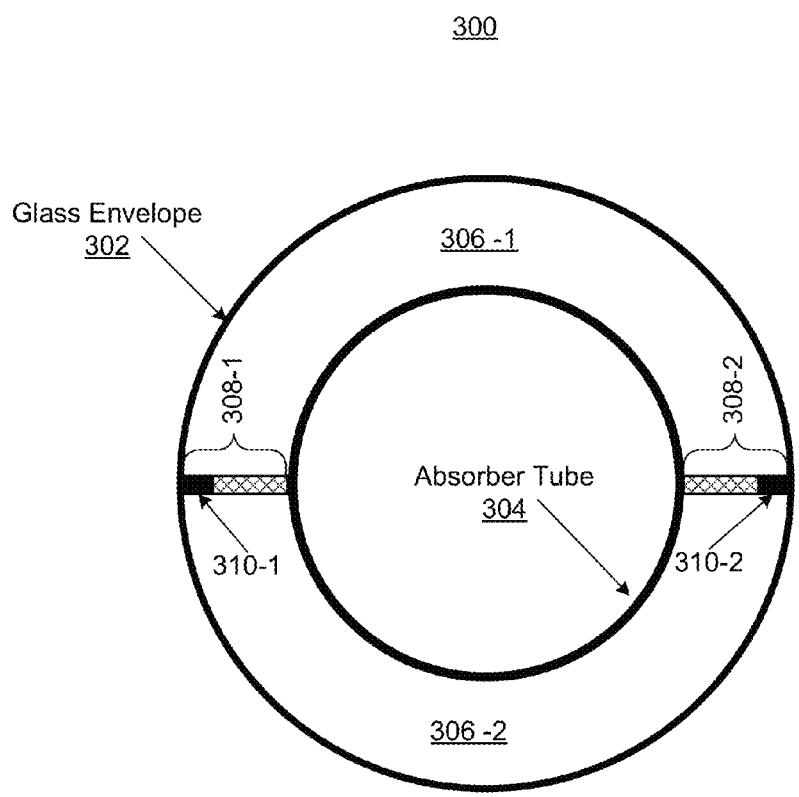
FIG. 3 shows exemplary aspects of a glass envelope-based solar receiver with a bifurcated annulus for thermal control and that is responsive to thermal dimensional changes, according to one embodiment.

FIG. 3 shows exemplary aspects of a glass solar power conversion receiver 300 with a bifurcated annulus for thermal control and comprising components (fins) that are responsive to thermal dimensional changes, according to one embodiment. As shown, receiver 300 comprises circular glass envelope 302 encapsulating a circular absorber tube 304. The area between the concentric circles respectably formed by the inner surface of glass envelope 302 and the outer surface of absorber tube 304 is annulus 306 (306-1 and 306-2). In contrast to conventional solar power conversion receivers, the annulus 306 of receiver 300 comprises two independent annulus portions/compartments 306-1 and 306-2.

A combination of fins 308-1 and 308-2 substantially seals off each annulus compartment 306 (306-1 or 306-2) from the other annulus compartment 306. To this end, each respective fin 308 (i.e., fin 308-1 or fin 308-2) is operatively coupled to the absorber tube 304 and the glass envelope 302. In one implementation, for example, each fin is: (a) fixed at one end to the absorber tube 304, and (b) in substantially firm and coherent contact with, but not fixed to, the glass envelope 302 at the other respective end. In one implementation, for example, a respective spot weld is used to fix a respective end of a fin to the absorber tube 304. Fixing techniques other than spot welding can be used to fix fin ends to the absorber tube. In this example, and since non-fixed fin ends are not permanently fixed to respective portions of glass envelope 302, the glass envelope can be removed (e.g., for maintenance) without compromising receiver structure. In another implementation, each respective fin 308 (i.e., fin 308-1 or fin 308-2) is substantially permanently fixed both to the absorber tube 304 and the glass envelope 302.

In this example, and although other fin 308 configurations are contemplated, as described below, each fin 308 extends in a radial direction from its respective attachment or contact point(s) on the absorber tube 304 to its respective contact or attachment point(s) on the glass envelope 302 to substantially seal annulus compartment 306-1 off from annulus compartment 306-2. In one implementation, this sealing is such that there is no exchange of material (e.g., gas) from one annulus compartment to the other annulus compartment. In this example, each fin 308 is opposite and symmetric with respect to its position in annulus 306 as compared to the position of the other fin 308 in the annulus 306 (i.e., the combination of portions 306-1 and 306-2). As shown, fin 306-1 is fixed to the absorber tube 304 and is operatively coupled to (i.e., in contact with or fixed to) glass envelope 302 pair such that it is positioned 180° from the position of the other fin 308-2.

In different implementations, the angles at which the fins 308 are respectably positioned within the glass envelope 302 are other than radial with respect to the common center of the receiver 300 and the absorber tube 304. For example, in one implementation, the angles at which fins 308 are operatively coupled to the glass envelope 302 and the absorber tube 304 are a function of the design of the parabolic mirror being used in the parabolic trough collector system to concentrate solar energy on receiver 300.

Figure 4:
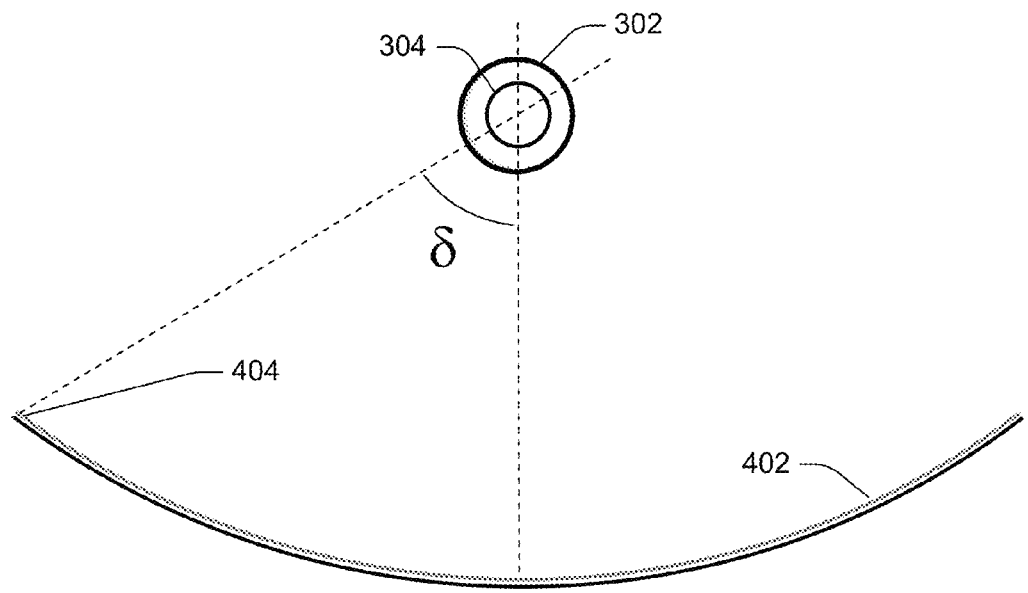
FIG. 4 shows an exemplary parabolic mirror with a rim angle delta ($\delta$), according to one embodiment.

FIG. 4 shows an exemplary parabolic mirror 402 operatively coupled to a bifurcated solar power conversion receiver 300, according to one embodiment. For purposes of exemplary illustration and description, the left-most reference number of each component in this figure refers to the particular figure that first introduced the component. As illustrated, the rim angle delta (δ) is defined as the angle confined between the sun's ray vector and an imaginary line connecting the center point of the receiver 300 and a tip 404 (a boundary edge) of the parabolic mirror 402.

Figure 5:
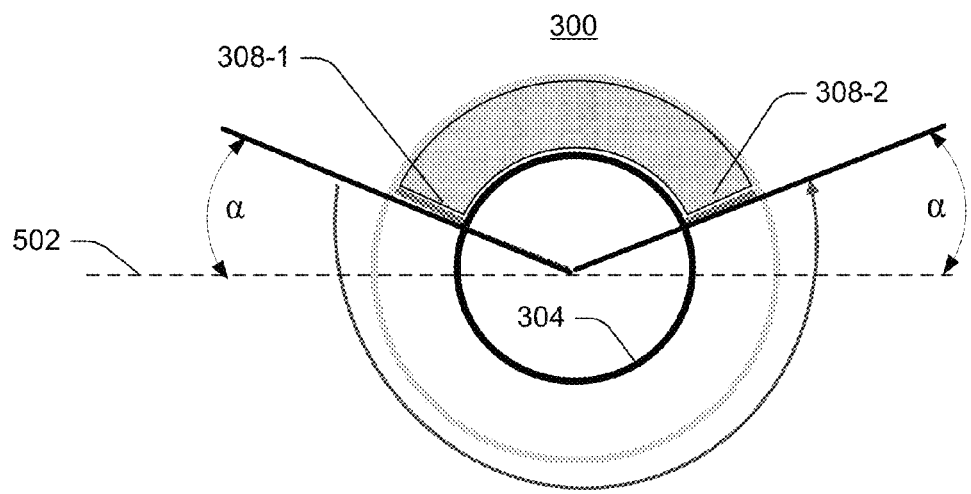
FIG. 5 shows further aspects of an exemplary glass envelope-based solar receiver with annulus bifurcating fins positioned within the receiver annulus based on parabolic mirror design, according to one embodiment.

FIG. 5 shows an exemplary glass envelope solar power conversion receiver 300, wherein annulus bifurcating fins 308 are positioned based on the design of a parabolic mirror used to concentrate solar energy on the receiver, according to one embodiment. More particularly, FIG. 5 shows each fin 308 positioned at an angle alpha (α) of 30° to an imaginary line (normal to the sun's rays) 502 passing through the center of the receiver 300. This exemplary fin 308 arrangement is suitable for one exemplary design of parabolic mirrors with a large rim angle of 90°. At smaller rim angles δ, the angle at which the fins 308 extend in the radial direction will be smaller. In general, however, the fins' location is determined in a way such that they separate the portion of the absorber tube 304 that receives solar radiation from the portion that receives little or no radiation.

Referring to FIG. 3, in one implementation at least distal portions 310 (i.e., 310-1 and 310-2) of each fin 308 are comprised of a material that expands and contracts responsive to expansion and/or contraction of receiver 300 components (e.g., two or more of absorber tube 304, annulus portions 306, and glass envelope 302), for example, responsive to temperature differentials. Such expansion and contraction properties maintain the integrity of the operative coupling (fixed or not fixed) of the fins 308 at least to the glass envelope 302 within a configurable range. Such a configurable range is a function of the particular materials selected for at least the distal portions of each fin 308. Additionally, because glass is brittle as compared to sheet metal, plastic, or other materials, this responsive design of fins 308 substantially addresses glass envelope fracturing/breakage issues that may otherwise occur with respect to maintaining integrity of the glass envelope 302 responsive to episodes of receiver 300 component expansion and contraction. Moreover, the ductile properties of material of at least the distal portions of fins 308 may facilitate the process of fixing fins 308 to the glass envelope 302 without breaking or fracturing the glass, for example, during receiver 300 manufacture and/or installation.

In one implementation, material of at least the distal end 310 of each fin 308 is densely-packed metal bristles which prevent leakage of air from the lower annulus compartment 306-2 to the upper annulus compartment 306-1, while being flexible enough as not to damage the glass tube as it expands when, for example, its temperature increases. In another implementation of the material of at least the distal end of 310 of each fin 308 is made of rubber in the form of flaps. In one implementation, each fin 308 is homogenous in its material makeup. For example, an entire fin 308 may completely be made from steel, rubber, or a polymeric material. In yet another implementation, each fin is heterogeneous in its material makeup. For example, a portion of a fin 308 proximal to its attachment point on the absorber tube 304 may be made out of a first material that is different from the forgiving/elastic material utilized at the distal portions 310-1 and 310-2 of fins 308 to operatively couple the fins to the glass envelope 302. One example of such a heterogeneous material makeup for a fin 308 is a fin whose main body is made of steel, while the distal portion is made of rubber.

Figure 6:
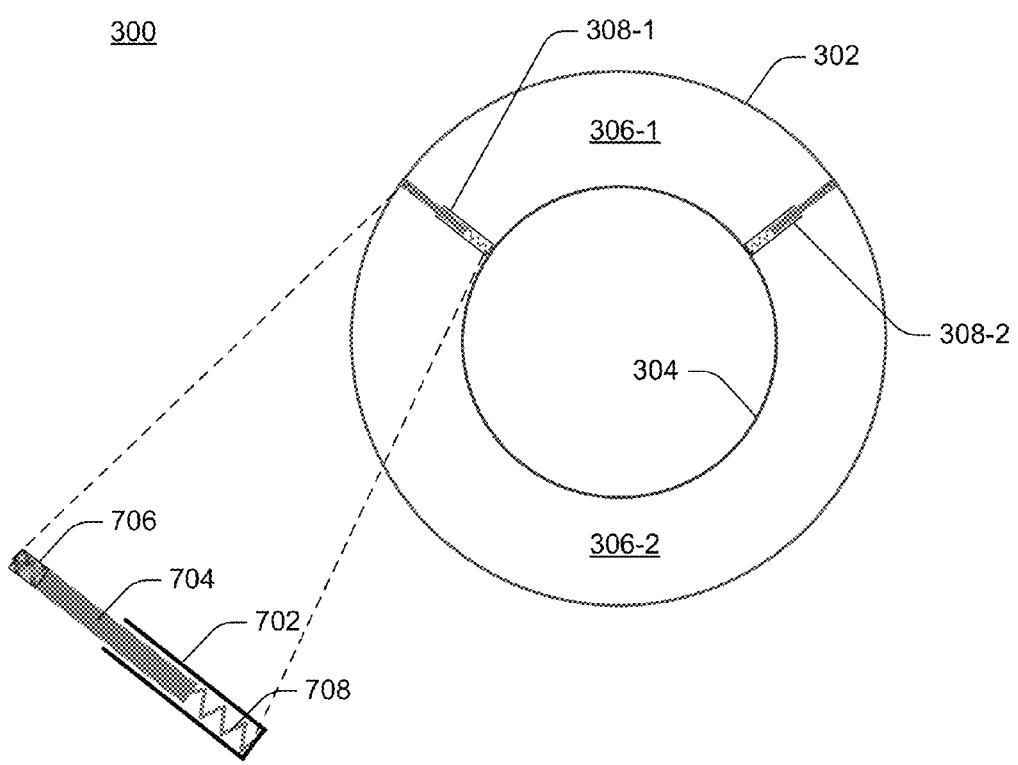
FIG. 6 shows further aspects of an exemplary glass envelope-based solar power conversion receiver for thermal control that is responsive to thermal dimensional changes, according to one embodiment. In particular.

FIG. 6 shows an exemplary glass-based solar power conversion receiver 300, wherein each fin of the two fins 308 bifurcating annulus 306 (306-1 and 306-2) comprises multiple independent components operatively configured to respond to and conform to thermal dimensional changes of the encapsulating glass envelope 302 and the absorber tube 304, according to one embodiment. For purposes of exemplary illustration and description, the left-most reference number of each component in this figure refers to the particular figure that first introduced the component. Here, each fin (e.g., 308-1 or 308-2) substantially seals off one annulus compartment 306 (306-1 or 306-2) from the other annulus compartment 306. In this implementation, however, and since fins 308 are in contact with the glass envelope 302 but not permanently attached or fixed to the glass envelope, small amounts of gas (e.g., air) may migrate from on annulus compartment into the other annulus compartment. When an insulating material fills the upper annulus compartment (e.g., please see FIG. 7, which is described below), such small scale gas migration is unlikely to initiate natural convection currents.

As shown, each fin 308 includes the following multiple components (a) a fixed hollow enclosure 702, (b) a main portion 704, (c) a tip portion 706, and (d) a spring 708. As illustrated, main portion 704 is slidably attached to hollow enclosure 702, allowing the main portion to slide into and out of the hollow enclosure 702 while maintaining the seal between annulus compartments. In this example, the tip portion 706 is made of a soft material and operatively coupled to the proximal end of the main portion 704. When referring to proximal and distal portions of respective components in FIG. 6, please note the following. The phrase "proximal end" refers to the end of a component that is nearest to absorber tube 304 as compared to other portions of the component. The phrase "distal end" refers to the end of a component that is nearest to glass envelope 302 as compared to other portions of the component. In this example, spring 708 is operatively attached to the proximal end and within hollow enclosure 702, and operatively attached to the proximal end of the main portion 704. This exemplary design provides a unique fin system that expands and contracts in unison with respective expansions and/or contractions of the glass envelope 302 and/or absorber tube 304. As contractions/expansions occur in the system, the respective components of each fin move accordingly, providing configurable amounts of fin component expansion and compression. Although a spring is utilized in this particular implementation, a different component or material could be utilized to perform similar spring-like functions responsive to compression, compression release, stretching/pulling, etc.

Figure 7:
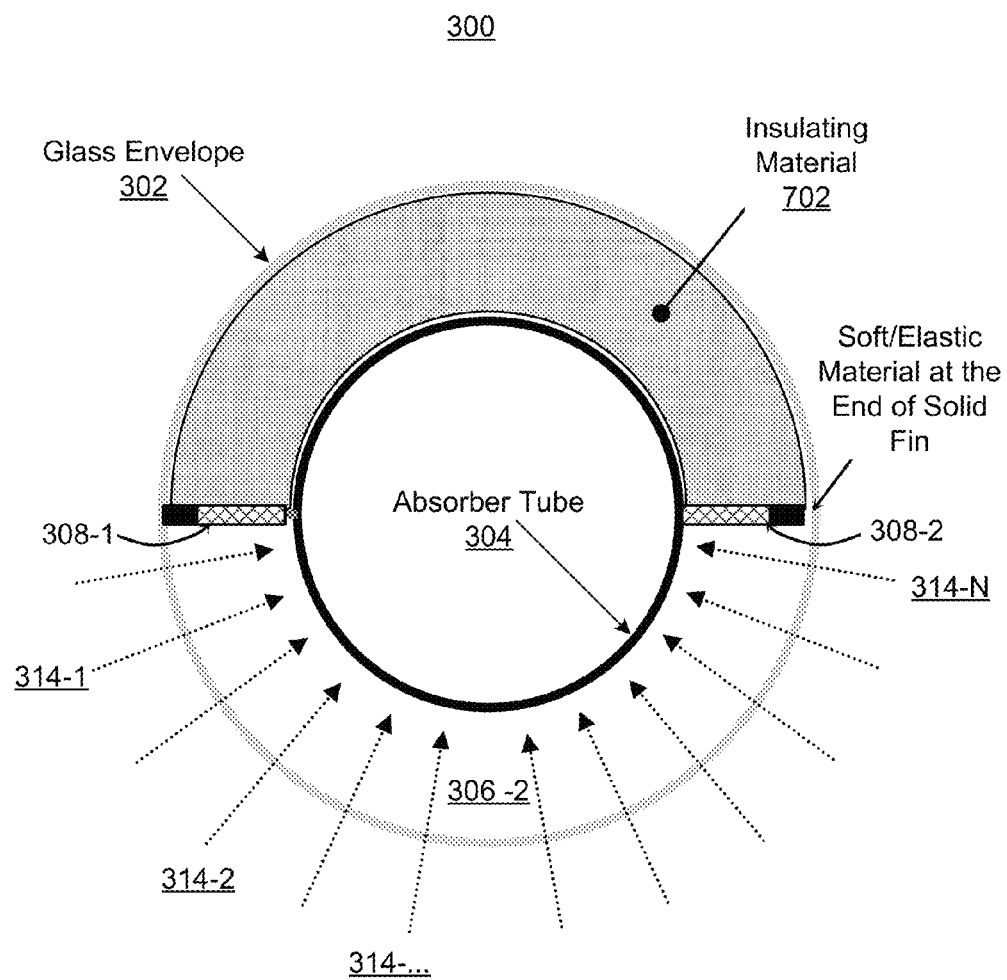
FIG. 7 shows further exemplary aspects of a bifurcated annulus solar power conversion receiver for use in a solar parabolic trough collector system, according to one embodiment. More specifically.

FIG. 7 shows further exemplary aspects of the exemplary solar power conversion receiver 300 comprising components for thermal control and responding to thermal dimensional changes (i.e., thermal expansions and contractions), according to one embodiment. For purposes of exemplary illustration and description, the left-most reference number of each component in this figure refers to the particular figure that first introduced the component. Referring to FIG. 7, and in this implementation, an insulating material 702 fills the upper annulus compartment 306-1 (FIG. 3).

In one embodiment, insulating material 702 is fiberglass, although other insulating materials such as Calcium Silicate or cellular glass could be used. Whereas annulus compartment 306-1 is filled with insulating material 702, lower annulus compartment 306-2 is filled with a gas such as air, hydrogen, helium, etc. For purposes of exemplary illustration, dotted arrows (e.g., arrows 314-1 through 314-N) represent solar radiation (at or near noon) irradiated onto bifurcated annulus solar power conversion receiver 300. As illustrated in this example, the upper/outward-facing portion of receiver 300, represented by annulus compartment 306-1 (FIG. 3) filled with insulating material 702 (FIG. 7), does not receive concentrated solar irradiation.

In one implementation, the portion of the absorber tube 304 that does not receive solar radiation (i.e., that portion of the absorber tube that is in contact with, or juxtaposed to, annulus compartment 306-1) does not need to be coated with a highly absorptive, selective coating. Selective coating substantially maximizes the amount of solar irradiation absorbed by the absorber tube while simultaneously inhibiting the emission of radiation by the tube. In existing systems, this coating is usually applied to the entire tube surface.

This segmented annulus architecture of solar conversion receiver 300, comprising in one implementation a first independent annulus compartment 306-1 filled with insulation, and a second independent annulus compartment 306-2 filled with gas, can substantially reduce heat losses by radiation from the outward-facing, insulation-filled compartment. Additionally, the segmented annulus architecture of solar conversion receiver 300 substantially eliminates heat loss by natural convection in the inward-facing, gas-filled compartment 306-2 when orientation of receiver 300 is as shown in FIG. 7, which occurs at or near noon. When the high-temperature surface of the absorber tube 304 is at the top, the gas in the lower annulus compartment 306-2 will stratify with the denser gas at the bottom (near the colder glass surface) and the lighter gas at the top (near the hotter absorber tube surface). In this scenario, gas movement in this compartment is substantially stagnant, the hot gas generally not migrating closer/lower to/towards the glass tube, which substantially reduces heat loss by convection. In contrast, and for purposes of comparison, moving gas/air can dramatically increase convection heat loss.

Moreover, the segmented annulus architecture of solar conversion receiver 300, comprising in one implementation a first independent annulus compartment 306-1 filled with insulation, and a second independent annulus compartment 306-2 filled with gas, substantially reduces heat losses by natural convection without requiring either partial or complete evacuation of the annulus 306 or respective annulus compartments 306-1 and 306-2.

In one implementation, the solar radiation facing portion of the annulus 306 (i.e., annulus segment 306-2) is filled with air and the outward-facing portion of the annulus 306 (i.e., annulus segment 306-1) is filled with insulation. In another implementation, both annulus segments 306-1 and 306-2 are filled with a gas (e.g., air or some other gas). Where an outward facing annulus segment 306-1 is not filled with insulation, the surface of the absorber tube 304 in contact with, or juxtaposed to, annulus segment 306-1 is coated with a substantially highly insulating layer such as acrylic/water film. This will increase thermal resistance, reduce the temperature of the upper part of the absorber tube, and thus reduce natural convection currents.

In an implementation where one or more of the annulus segments 306 is/are filled with air, a vacuum need not be maintained in the air-containing annulus segment(s) 306-1 and/or 306-2. Where one or more annulus segments 306 are filled with air, presence of small cracks in the glass envelope 302 that do not jeopardize the structural integrity of the receiver 300 and are juxtaposed or over the one or more annulus segments filled with air (or insulation) will not significantly affect the solar power conversion performance of receiver 300. Accordingly, presence of small cracks in the glass envelope 302 that do not jeopardize the structural integrity of the glass envelope will not necessarily require replacement of the entire receiver 300 to maintain normal functioning of the associated parabolic trough collector system. In one scenario, for example, such small cracks in the glass envelope 302 could be treated (e.g., sealed) on site to extend the lifetime of receiver 300. This is in contrast to conventional receivers that have an evacuated annulus. Such conventional receivers would cease to operate normally if a small crack in the glass envelope compromised the vacuum in the annulus, likely requiring replacement (or substantial refitting) to maintain functioning and efficiencies of the corresponding parabolic trough collector system.

Figure 8:
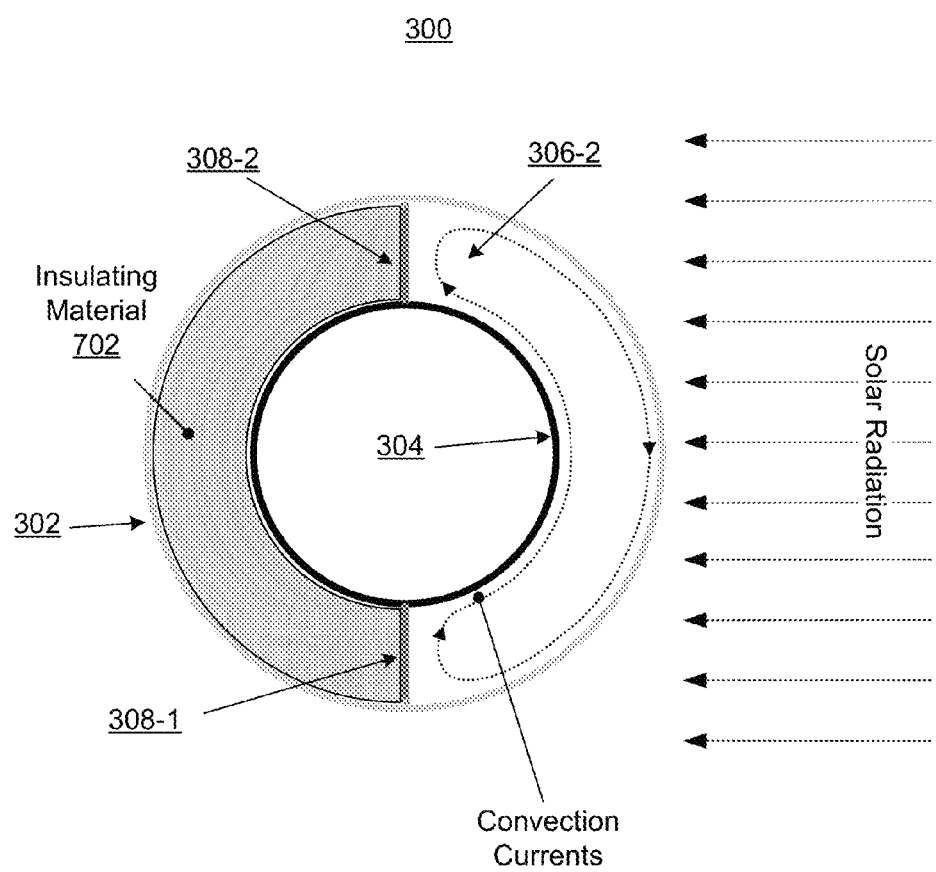
FIG. 8 shows further aspects of an exemplary bifurcated annulus solar power conversion receiver, according to one embodiment. More specifically.

FIG. 8 shows further aspects of an exemplary glass envelope-based solar power conversion receiver 300, according to one embodiment. For purposes of exemplary illustration and description, the left-most reference number of each component in this figure refers to the particular figure that first introduced the component. In particular, FIG. 8 illustrates rotation of the receiver 300, for example, to receive substantially optimal amounts of solar irradiation (at or near sunrise or sunset) from a parabolic mirror and a parabolic trough collector system. Other rotational configurations, including intermediate rotational configurations, of the bifurcated annulus solar power conversion receiver 300 are contemplated.

Conclusion

Although the above sections describe a glass solar power conversion receiver 300 (with components for thermal control that are also responsive to thermal dimensional changes) in language specific to structural features, the implementations defined in the appended claims are not necessarily limited to the specific described features. Rather, the specific features for the glass solar receiver 300 (FIG. 3 through FIG. 8) and a corresponding parabolic trough collector system comprising the receiver are disclosed as exemplary forms of implementing the claimed subject matter.

The invention claimed is:

1. A solar power conversion receiver comprising:
a circular glass envelope;
an absorber tube encapsulated within the circular glass envelope;
a bifurcated annulus positioned in between the circular glass envelope and the absorber tube; and
a first fin and a second fin each having an operative coupling, respectively, to the circular glass envelope and the absorber tube, with seals formed therebetween, to create a first annulus compartment and a second annulus compartment in the bifurcated annulus, the seals of the operative coupling formed from the first fin to the circular glass envelope and the absorber tube, and the seals of the operative coupling formed from the second fin to the circular glass envelope and the absorber tube, each configured to prevent exchange of material between the first annulus compartment and the second annulus compartment, the first annulus compartment being independent of the second annulus compartment, and the first fin and the second fin having a configurable range of expansion and contraction configured to maintain the seals of the operative coupling in response to expansion and contraction of components in the solar power conversion receiver due to temperature effects.

2. The solar power conversion receiver of claim 1, wherein respective proximal ends of the first and second fins are fixed to the absorber tube, and wherein respective distal ends of the first and second fins are not fixed to the circular glass envelope.

3. The solar power conversion receiver of claim 1, wherein each of the first and second fins is a single contiguous component that is heterogeneous in material makeup from a first attachment point to the circular glass envelope to a second attachment point to the absorber tube.

4. The solar power conversion receiver of claim 1, wherein at least one compartment of the first and second annulus compartments is filled with a gas.

5. The solar power conversion receiver of claim 1, wherein the first and second fins seal off any exchange of gas from one annulus compartment to another annulus compartment.

6. The solar power conversion receiver of claim 1, wherein the solar conversion receiver is operatively coupled to a parabolic trough collector system.

7. The solar power conversion receiver of claim 1, wherein each of the first and second fins comprises multiple independent components operatively configured to work together to maintain integrity of the circular glass envelope.

8. The solar power conversion receiver of claim 7, wherein the multiple independent components comprise a hollow enclosure, a main portion, a tip portion, and a spring component, the main portion being slidably attached to the hollow enclosure, at least a part of the main portion being within an empty potion of the hollow enclosure.

9. The solar power conversion receiver of claim 1, wherein the first and second fins are operatively coupled to respective locations on the circular glass envelope and the absorber tube, the respective locations separating the portion of the absorber tube that receives solar radiation from a portion that receives no solar radiation.

10. The solar power conversion receiver of claim 6, wherein the solar power conversion receiver further comprises insulation substantially filling the first annulus compartment, the first annulus compartment being configured for positioning on the parabolic trough collector to face away from solar radiation reflected by a mirror portion of the parabolic trough collector, the second annulus compartment being configured to receive solar radiation from the mirror portion.

11. The solar power conversion receiver of claim 10, wherein an outer perimeter of the absorber tube includes a partial coating of an insulating layer.

12. A parabolic trough collector system comprising:
a parabolic mirror;
a solar power conversion receiver operatively coupled to the parabolic mirror, the solar power conversion receiver being positioned to receive concentrated solar energy from the parabolic mirror, the solar power conversion receiver comprising:
(a) a circular glass envelope;
(b) an absorber tube encapsulated within the circular glass envelope;
(c) a bifurcated annulus positioned in between the circular glass envelope and the absorber tube; and
(d) a first fin and a second fin each having an operative coupling, respectively, to the circular glass envelope and the absorber tube, with seals formed therebetween, to create a first annulus compartment and a second annulus compartment in the bifurcated annulus, the seals of the operative coupling formed from the first fin to the circular glass envelope and the absorber tube, and the seals of the operative coupling formed from the second fin to the circular glass envelope and the absorber tube, each configured to prevent exchange of material between the first annulus compartment and the second annulus compartment, the first annulus compartment being independent of the second annulus compartment, and the first fin and the second fin having a configurable range of expansion and contraction configured to maintain the seals of the operative coupling in response to expansion and contraction of components in the solar power conversion receiver due to temperature effects.

13. The solar power conversion receiver of claim 1, wherein each proximal end of the first and second fins is permanently fixed to the absorber tube, and wherein each distal end of the first and second fins is permanently fixed to the circular glass envelope.

14. The parabolic trough collector system of claim 12, wherein each of the first and second fins comprises a glass attachment portion for attaching to the circular glass envelope, and one or more other portions, the glass attachment portion being made out of a first material that is different from material comprising at least one of the one or more other portions.

15. The parabolic trough collector system of claim 12, wherein the first and second annulus compartments are filled with air, and wherein the first and second fins seal off any exchange of gas from the at least one compartment to a different annulus compartment.

16. The parabolic trough collector system of claim 12, wherein each of the first and second fins comprises multiple independent components.

17. The parabolic trough collector system of claim 16, wherein the multiple independent components comprise a hollow enclosure, a main portion, a tip portion, and a spring component, the main portion being slidably attached to the hollow enclosure, at least a part of the main portion being within an empty potion of the hollow enclosure, the tip portion being operatively configured for attachment to a location on the circular glass envelope and a location on a proximal end of the main portion, the spring being operatively attached to a distal end and within the hollow enclosure, the hollow enclosure being operatively configured for attachment to the absorber tube.

18. The parabolic trough collector system of claim 12, wherein the first and second fins are operatively coupled to respective locations on the circular glass envelope and the absorber tube, the respective locations separating the portion of the absorber tube that receives solar radiation from a portion that receives no solar radiation.

19. The parabolic trough collector system of claim 12, wherein the solar power conversion receiver further comprises insulation substantially filling the first annulus compartment, the first annulus compartment being configured for positioning on the parabolic trough collector to face away from solar radiation reflected by a mirror portion of the parabolic trough collector, the second annulus compartment being configured to receive solar radiation from the mirror portion.

20. The parabolic trough collector system of claim 19, wherein an outer perimeter of the absorber tube includes a partial coating of an insulating layer, the partial coating being on areas of the outer perimeter that are in juxtaposition with the second annulus compartment, the second annulus compartment being configured to receive solar radiation from a parabolic mirror portion of the parabolic trough collector.

* * * * *